United States Patent
Chida

(10) Patent No.: US 9,143,593 B2
(45) Date of Patent: Sep. 22, 2015

(54) ADDRESSEE INFORMATION NOTIFICATION SYSTEM, ADDRESSEE INFORMATION NOTIFICATION METHOD, APPLICATION SERVER AND COMMUNICATION TERMINAL

(75) Inventor: Koichi Chida, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1385 days.

(21) Appl. No.: 12/289,869

(22) Filed: Nov. 6, 2008

(65) Prior Publication Data

US 2009/0214015 A1   Aug. 27, 2009

(30) Foreign Application Priority Data

Feb. 25, 2008   (JP) ................. 2008-043165

(51) Int. Cl.
*H04M 3/42* (2006.01)
*H04M 1/57* (2006.01)
*H04M 3/54* (2006.01)

(52) U.S. Cl.
CPC ............ *H04M 1/57* (2013.01); *H04M 3/42042* (2013.01); *H04M 3/54* (2013.01); *H04M 3/42102* (2013.01); *H04M 2203/1091* (2013.01)

(58) Field of Classification Search
CPC ......... H04M 3/54; H04M 3/58; H04M 3/436; H04M 3/533; H04M 3/42229; H04M 3/42323; H04M 2207/12; H04Q 3/625; H04Q 3/2209
USPC ........................................ 379/211.01–212.01
See application file for complete search history.

(56) References Cited

U.S. PATENT DOCUMENTS

| | | | | |
|---|---|---|---|---|
| 5,440,620 | A * | 8/1995 | Slusky ..................... | 379/100.07 |
| 6,157,640 | A * | 12/2000 | Valentine ..................... | 370/384 |
| 6,310,947 | B1 * | 10/2001 | Polcyn ..................... | 379/211.01 |
| 6,327,354 | B1 * | 12/2001 | Pelletier et al. .......... | 379/201.01 |
| 6,771,761 | B1 * | 8/2004 | LaPierre ................... | 379/211.02 |
| 6,826,271 | B1 * | 11/2004 | Kanabar et al. .......... | 379/212.01 |
| 7,062,027 | B2 * | 6/2006 | Oikawa et al. ........... | 379/211.02 |
| 7,103,167 | B2 * | 9/2006 | Brahm et al. ............. | 379/211.02 |
| 7,221,753 | B2 * | 5/2007 | Hutton et al. ............. | 379/265.11 |
| 7,280,530 | B2 * | 10/2007 | Chang et al. ................. | 370/352 |

(Continued)

FOREIGN PATENT DOCUMENTS

JP   A 2007-043682   2/2007

*Primary Examiner* — Simon Sing
(74) *Attorney, Agent, or Firm* — Solaris Intellectual Property Group, PLLC

(57) ABSTRACT

An addressee information notification system includes an application server which, based on an addressee number requested by an incoming call connection request, selects one transfer destination terminal from plural alternative transfer destination terminals associated with the addressee number, and transfers the call connection request to the selected terminal, and plural terminals configured as alternative transfer destinations. The application server includes an addressee information attachment section that attaches addressee information in the form of the addressee number or identification information associated with the addressee number to the call connection request to be transferred to the selected terminal. At least one of the plural terminals has an addressee information output section that, when a call connection request is provided to that terminal from the application server, outputs the addressee information attached to the call connection request before the terminal is taken off-hook.

12 Claims, 4 Drawing Sheets

(56) References Cited

U.S. PATENT DOCUMENTS

| | | |
|---|---|---|
| 7,283,829 B2 * | 10/2007 | Christenson et al. ......... 455/461 |
| 7,526,079 B2 * | 4/2009 | Mello ...................... 379/212.01 |
| 7,668,305 B2 * | 2/2010 | Akizuki et al. .......... 379/211.01 |
| 7,751,537 B2 * | 7/2010 | Poustchi et al. ........... 379/88.18 |
| 8,270,582 B1 * | 9/2012 | Kirchhoff et al. ........ 379/201.01 |
| 8,351,913 B2 * | 1/2013 | Ramanathan et al. ........ 455/415 |
| 8,798,258 B1 * | 8/2014 | Croak et al. ............. 379/266.09 |
| 2003/0073431 A1 * | 4/2003 | Dorenbosch .................. 455/417 |
| 2005/0277407 A1 * | 12/2005 | Ahn et al. .................. 455/414.1 |
| 2007/0092073 A1 * | 4/2007 | Olshansky et al. ........... 379/232 |
| 2007/0248221 A1 * | 10/2007 | Chatterjee et al. ....... 379/211.02 |
| 2008/0260137 A1 * | 10/2008 | Poi et al. .................. 379/212.01 |
| 2008/0304471 A1 * | 12/2008 | Jackson et al. ................ 370/352 |
| 2010/0128857 A1 * | 5/2010 | Logan ....................... 379/88.22 |

\* cited by examiner

FIG. 3

| SUBSCRIBER IDENTIFICATION INFORMATION | FMC SERVICE NUMBER | TRANSFER DESTINATION NUMBER | ACTIVE FLAG |
|---|---|---|---|
| B | 060-1234-xxxx | 050-2345-yyyy | ○ |
| | | 090-3456-zzzz | |
| C | 060-4567-aaaa | 050-2345-yyyy | ○ |
| | | 090-5678-bbbb | |

ADDRESSEE INFORMATION NOTIFICATION SYSTEM, ADDRESSEE INFORMATION NOTIFICATION METHOD, APPLICATION SERVER AND COMMUNICATION TERMINAL

CROSS-REFERENCE TO RELATED APPLICATION

This application claims priority under 35 USC 119 from Japanese Patent Application No. 2008-043165, the disclosure of which is incorporated by reference herein.

BACKGROUND OF THE INVENTION

1. Field of the Invention

The present invention relates to an addressee information notification system, an addressee information notification method, an application server and a communication terminal, and can be applied, for example, to the provision of addressee information notification services predicated on fixed-mobile convergence (FMC) services in a communication environment for telephones, video telephones, or the like.

2. Description of the Related Art

Conventionally, in a terminal receiving a call, the telephone number of the party making the call (the calling source), or the name or the like of the calling source registered in association with the telephone number, are displayed (for example, see Japanese Patent Application Laid-Open (JP-A) No. 2007-43682).

However, in the receiving (addressee) terminal, once the terminal has been taken off-hook, it is not possible to determine whom the calling source made the call in order to speak to without actually initiating dialogue with the calling source.

For example, when the addressee terminal is a mobile terminal possessed by an individual, it is generally self-evident whom the calling source made the call in order to speak to. However, when the call destination is, for example, a terminal shared by multiple persons (such as a fixed household telephone or a switchboard telephone at a business establishment), it is not possible to determine whom the calling source made the call in order to speak to. An increase in instances of shared use by multiple persons of fixed terminals that are used in situations in which mobile terminals cannot be used, is anticipated in cases in which FMC services have been introduced.

SUMMARY OF THE INVENTION

In view of the above circumstances, the present invention provides an addressee information notification system and an addressee information notification method that can provide information advertising the calling source's intended addressee at the addressee terminal, and provides an application server and communication terminal that can realize this notification function.

According to a first aspect of the present invention, an addressee information notification system includes: an application server that, based on an addressee number requested by an incoming call connection request, selects one transfer destination terminal from plural alternative transfer destination terminals associated with the addressee number, and transfers the call connection request to the selected transfer destination terminal, the application server comprising an addressee information attachment section that attaches addressee information comprising the addressee number or identification information associated with the addressee number to the call connection request to be transferred to the selected transfer destination terminal; and plural terminals, each of which is configured as an alternative transfer destination, at least one of the plural terminals having an addressee information output section that, when a call connection request is provided to the at least one of the plural terminals from the application server, outputs addressee information attached to the call connection request before the at least one of the plural terminals is taken off-hook.

According to a second aspect of the present invention, an application server, based on an addressee number requested by an incoming call connection request, selects one transfer destination terminal from plural alternative transfer destination terminals associated with the addressee number, and transfers the call connection request to the selected transfer destination terminal, the application server including an addressee information attachment section that attaches addressee information including the addressee number or identification information associated with the addressee number to the call connection request to be transferred to the selected transfer destination terminal.

According to a third aspect of the present invention, a communication terminal is configured as a transfer destination terminal in an addressee information notification system in which an application server, based on an addressee number requested by an incoming call connection request, selects one transfer destination terminal from plural alternative transfer destination terminals associated with the addressee number, and transfers the call connection request to the selected transfer destination terminal, the call connection request having addressee information comprising the addressee number or identification information associated with the addressee number attached thereto, the communication terminal including an addressee information output section that, when a call connection request is provided from the application server, outputs addressee information attached to the call connection request before the terminal is taken off-hook.

According to a fourth aspect of the present invention, an addressee information notification method includes: making a call connection request to an application server; selecting, based on an addressee number requested by the call connection request, one transfer destination terminal from plural alternative transfer destination terminals associated with the addressee number; attaching addressee information comprising the addressee number or identification information associated with the addressee number to the call connection request; transferring the call connection request to the selected transfer destination terminal; receiving the call connection request at the selected transfer destination terminal; and outputting the addressee information attached to the call connection request at the selected transfer destination terminal before the terminal is taken off-hook.

BRIEF DESCRIPTION OF THE DRAWINGS

Exemplary embodiments of the present invention will be described in detail based on the following figures, wherein:

FIG. 3 is an explanatory diagram showing the configuration of an FMC service subscriber database according to the first embodiment;

DETAILED DESCRIPTION OF THE INVENTION

(A) First Exemplary Embodiment

A first exemplary embodiment of an addressee information notification system, an addressee information notification method, an application server and a communication terminal according to the present invention is described in detail below with reference to the drawings. The addressee information notification system according to the first embodiment is applied to a One-Number FMC service system.

(A-1) Configuration of First Embodiment

Figure 1:
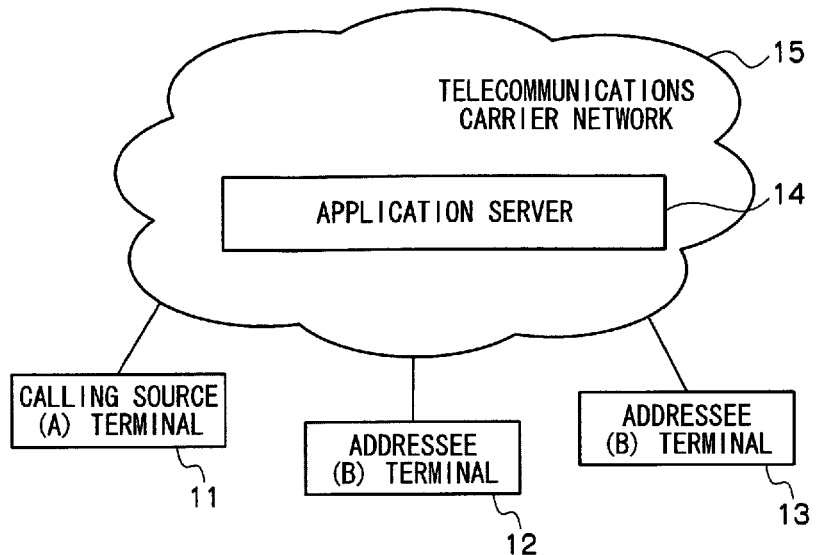
FIG. 1 is a block diagram showing the connection configuration of respective devices belonging to an FMC service system (addressee information notification system) according to a first exemplary embodiment.

FIG. 1 is a block diagram showing the connection configuration of respective devices belonging to FMC service system (addressee information notification system) 10 according to the first embodiment.

In FIG. 1, FMC service system 10 according to the first embodiment has calling source terminal 11, addressee terminals 12 and 13, and application server 14, which is provided at telecommunications carrier network 15 and provides an FMC service.

Terminals 11-13 are terminals such as telephones and video telephones used in communication services and, in the present embodiment, terminal 11 is described as a terminal associated with calling source A and terminals 12 and 13 are described as terminals associated with addressee B, who is an FMC service subscriber.

In the present embodiment, calling source terminal 11 and addressee terminal 12 are explained as fixed terminals; however, the present invention is not limited to this embodiment and it is not necessary for the calling source and/or addressee terminals to be fixed terminals. Calling source terminal 11 and addressee terminal 13 may respectively belong to different telecommunications carriers, and may belong to either Circuit Switching (CS) networks or Packet Switching (PS) networks. Addressee terminal 12 is a PS network terminal and an SIP client. Plain Old Telephone Service (POTS) networks and 3G mobile networks are CS networks and IP telephone networks with Wi-Fi broadband connections or the like correspond to PS networks.

Figure 2:
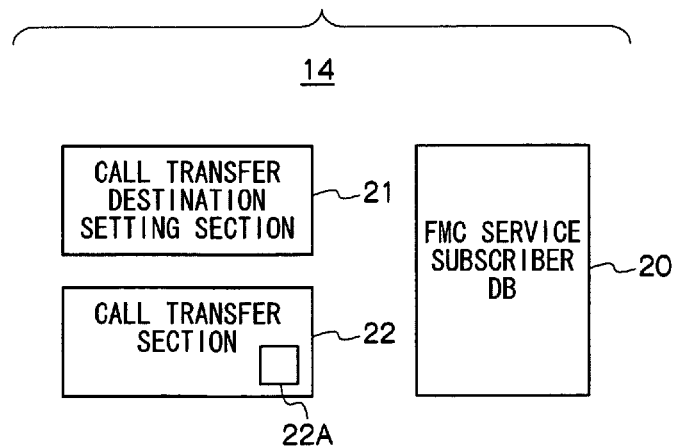
FIG. 2 is a block diagram showing the internal configuration of an application server with respect to functions associated with the FMC service according to the first embodiment.

FIG. 2 is a block diagram showing an internal configuration of application server 14 with respect to functions associated with the FMC service.

In FIG. 2, application server 14 has FMC service subscriber database (FMC service subscriber DB) 20 having data structure shown in FIG. 3 for example, call transfer destination setting section 21 and call transfer section 22.

As shown in FIG. 3, FMC service subscriber database 20 has data items including subscriber identification information such as the name or nickname of a subscriber, an FMC service number beginning with the digits "060" and corresponding to the subscriber, multiple (or single) numbers (transfer destination numbers) respectively associated with alternative call transfer destinations, and transfer destination flags showing which of the numbers is currently designated as the call transfer destination.

In the example shown in FIG. 3, the FMC service number of subscriber (receiver) B is 060-1234-xxxx, the numbers for the alternative transfer destinations thereof are 050-2345-yyyy and 090-3456-zzzz, and number 050-2345-yyyy is currently designated active. Further, the FMC service number of subscriber (receiver) C is 060-4567-aaaa, the numbers for the alternative transfer destinations thereof are 050-2345-yyyy and 090-5678-bbbb, and number 050-2345-yyyy is currently designated active. In this way, it is possible for multiple subscribers (for example, family members or employees in the same department of a business establishment) to share use of a fixed telephone and, at a given time, the same fixed telephone may be set as the active call transfer destination for the multiple subscribers.

As described above, subscriber (addressee) B has the numbers of terminals 12 and 13 registered as the numbers for the transfer destination. It should be noted that FIG. 3 is simply one example and that different configurations are, of course, possible. Here, terminal 12 is assumed to be a fixed terminal having a 0AB-J number or a 050 number that is used commonly by multiple persons belonging to a family, corporate entity or the like, while terminal 13 is assumed to be a mobile terminal having a 070, 080 or 090 number that is used by an individual. 0AB-J number area is allocated for POTS (Plain Old Telephone Service) terminals in Japan. 050 number area is allocated for VoIP terminals in Japan. 060 number area is allocated for FMC (Fixed Mobile Convergence) one-number service in Japan. 070,080,090 number area is allocated for mobile terminals in Japan.

Telecommunications carrier network 15 to which terminals 11-13 belong may consist of a single telecommunications carrier or may be an interconnected network of multiple telecommunications carriers.

The subscriber identification information, the FMC service number and the numbers for the call transfer destination without an associated transfer destination flag are set when a subscription contract is entered into and the data are registered in database 20.

Call transfer destination setting section 21 switches the active transfer destination flag in FMC service subscriber database 20; in other words, it switches the active call transfer destination. Call transfer destination setting section 21 may switch the active transfer destination flag in response to an operation by the FMC service subscriber. For example, the active transfer destination flag may be switched according to a similar sequence to that when a subscriber sets a transfer destination number using an existing transfer service. Further, call transfer destination setting section 21 may, in accordance with presence information provided by a presence server (not shown), automatically switch the active transfer destination flag when triggered by an update to the presence information. For example, when the updated presence information provided by the presence server indicates that a subscriber is present, call transfer destination setting section 21 may activate the transfer destination flag for the transfer destination number associated with a fixed terminal and, when the updated presence information indicates that a subscriber is absent, call transfer destination setting section 21 may activate the transfer destination flag for the transfer destination number associated with a mobile terminal.

When a request (for example, an INVITE request message in Session Initiation Protocol (SIP)) is received to connect a call to an addressee number that is an FMC service number, call transfer section 22 searches FMC service subscriber database 20 based on the incoming FMC service number, extracts the active call transfer destination number and sends a call connection request to the active call transfer destination.

In the first embodiment, call transfer section 22 incorporates addressee information attachment section 22A, and addressee information attachment section 22A attaches, to the call connection request to be sent to the active call transfer destination, information that effects display of addressee information. The addressee information is the FMC service number or the subscriber identification information corresponding to the FMC service number. For example, when the call connection request to be sent to the active call transfer destination is an INVITE request message, addressee information is inserted as an optional parameter value of the SIP message header of the INVITE request message. Further, for example, call transfer section 22 attaches the addressee information to be displayed to the call connection request to be sent to the active call transfer destination according to a method similar to that which currently enables the display function of the calling source number.

When calling source display information (a calling source number display command) is included in the incoming call connection request for the FMC service number, call transfer section 22 leaves the calling source display information included in the call connection request to the active call transfer destination.

Figure 4:
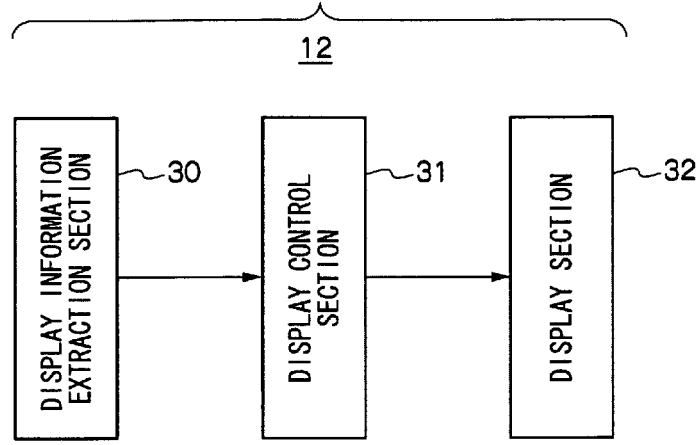
FIG. 4 is a block diagram showing the internal configuration of an addressee terminal with respect to functions associated with addressee notification according to the first embodiment.

FIG. 4 is a block diagram showing an internal configuration of addressee terminals 12 or 13 (terminal 12 in the explanation of FIG. 4) with respect to functions associated with addressee notification.

In FIG. 4, addressee terminal 12 has display information extraction section 30, display control section 31 and display section 32. Addressee terminal 12 is provided with a commonplace configuration for functioning in response to an incoming call connection request, so as to send back a call control signal associated with a ring back tone, sound the ringer or the like when a call connection request arrives from application server 14; however, these functions are omitted from FIG. 4.

Display information extraction section 30 extracts information to be displayed from a call connection request arriving from application server 14. Display information extraction section 30 extracts addressee information from the incoming call connection request and also extracts calling source display information if calling source display information is included in the call connection request.

Display section 32 is, for example, a liquid crystal display of addressee terminal 12.

Display control section 31 effects display of the display information extracted by display information extraction section 30 at display section 32. When only addressee information is extracted as display information, display control section 31 effects display of only the addressee information at display section 32. When addressee information and calling source display information are extracted as display information, display control section 31 effects display of the addressee information and the calling source display information at display section 32. At this time, when it is not possible to display the addressee information and the calling source display information at the same time owing to, for example, display section 32 having a small display area or only a limited number of lines available for display, display control section 31 effects alternate display of the addressee information and the calling source display information at display section 32 by time-sharing (for example, alternating every two seconds).

(A-2) Operation of First Embodiment

Figure 5:
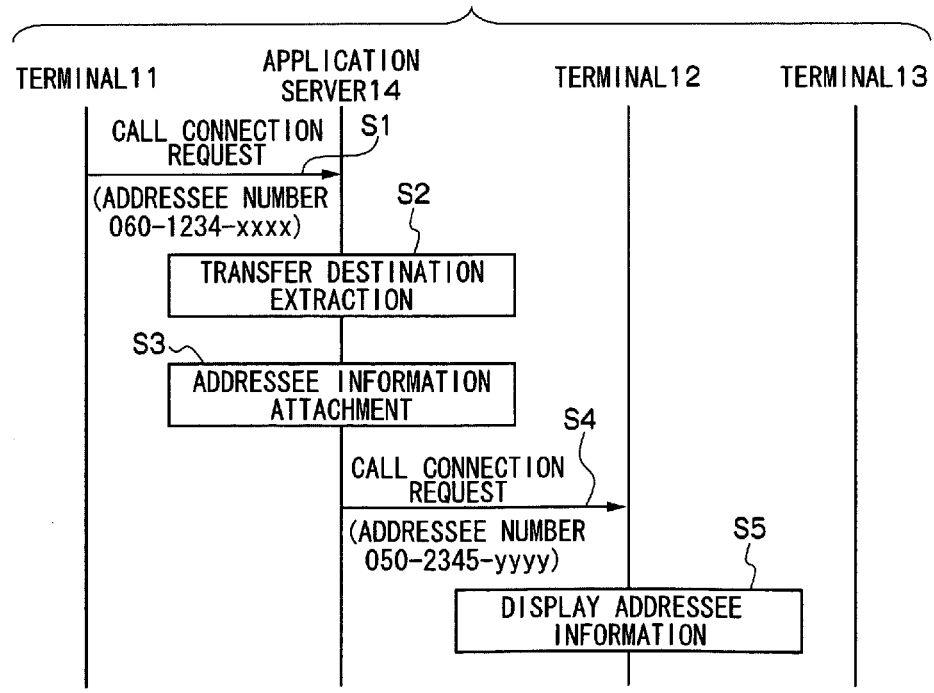
FIG. 5 is a sequence diagram showing the operations of the addressee information notification system according to the first embodiment.

Next, the operation of the addressee information notification system according to the first embodiment (the addressee information notification method of the first embodiment) is explained with reference to the sequence of FIG. 5. FIG. 5 shows the sequence of operation when calling source terminal 11 calls the One-Number FMC service number 060-1234-xxxx of subscriber (addressee) B.

When calling source A calls (sends a call connection request to) the 060 number 060-1234-xxxx associated with addressee B from calling source terminal 11, the call is received by application server 14, which processes the One-Number FMC service number (S1).

Application server 14 searches FMC service subscriber database 20 based on the incoming FMC service number and extracts a number for an active call transfer destination (S2). In FMC service subscriber database 20 as shown in FIG. 3, when the number 060-1234-xxxx is incoming, the number 050-2345-yyyy is extracted as the call transfer destination number because the active transfer flag is set at number 050-2345-yyyy.

Application server 14 attaches addressee information to a call signal (call connection request) to be sent to the call transfer destination of terminal 12 (S3) and then sends the call signal to call transfer destination terminal 12 (S4). For example, if the call signal is an INVITE request message, the 060 number 060-1234-xxxx associated with addressee B or the name, nickname or other identification information of addressee B are attached as an optional parameter value of the SIP message header of the INVITE request message.

When the active transfer flag is set at the other number 090-3456-zzzz, application server 14 attaches addressee information to a call signal (call connection request) to be sent to the call transfer destination of terminal 13 associated with this number (S3) and then sends the call signal to call transfer destination terminal 13 (S4).

Terminal 12, to which the call signal (call connection request) has been transferred, extracts the addressee information from the call signal and displays it. For example, if the call signal (call connection request) is an INVITE request message, upon receiving the optional parameter value of the SIP message header of the INVITE request message, addressee terminal 12 displays the addressee information of subscriber B who is the intended addressee of the calling source together with calling source information obtained from the From header value (S5).

At this time, with the content stored in FMC service subscriber database 20 is as shown in FIG. 3, suppose a certain calling source calls the 060 number 060-4567-aaaa associated with subscriber C. In this case also, application server 14 sends a call signal to the call transfer destination of terminal 12 (S4). However, in this case, the addressee information attached to the call signal consists of the 060 number 060-4567-aaaa associated with addressee C or the name, nickname or other identification information of addressee C.

(A-3) Effects of First Embodiment

According to the first embodiment, since addressee information is displayed at the addressee terminal, it is possible to determine which user at the addressee terminal side is the intended addressee of the calling source prior to taking the terminal off-hook and initiating dialogue.

As described above, even when multiple users share use of the terminal which is the call transfer destination corresponding to the One-Number FMC service number, it is possible to determine the intended addressee of the calling source and, therefore, ease of response is improved. For example, when a call is made to terminal 12, information advertising whether the addressee is subscriber B or subscriber C is displayed at the terminal, whereby the displayed addressee can receive the call.

(B) Second Exemplary Embodiment

Next, a second exemplary embodiment of the addressee information notification system, addressee information notification method, application server and communication terminal according to the present invention is described in detail with reference to the drawings.

In the FMC service system according to the second embodiment, the functional configuration of the addressee terminal differs from that of the first embodiment. In the second embodiment, the addressee information that application server 14 attaches to the call signal (call connection request) to be sent to the call transfer destination terminal 12 is the 060 number associated with the addressee.

Figure 6:
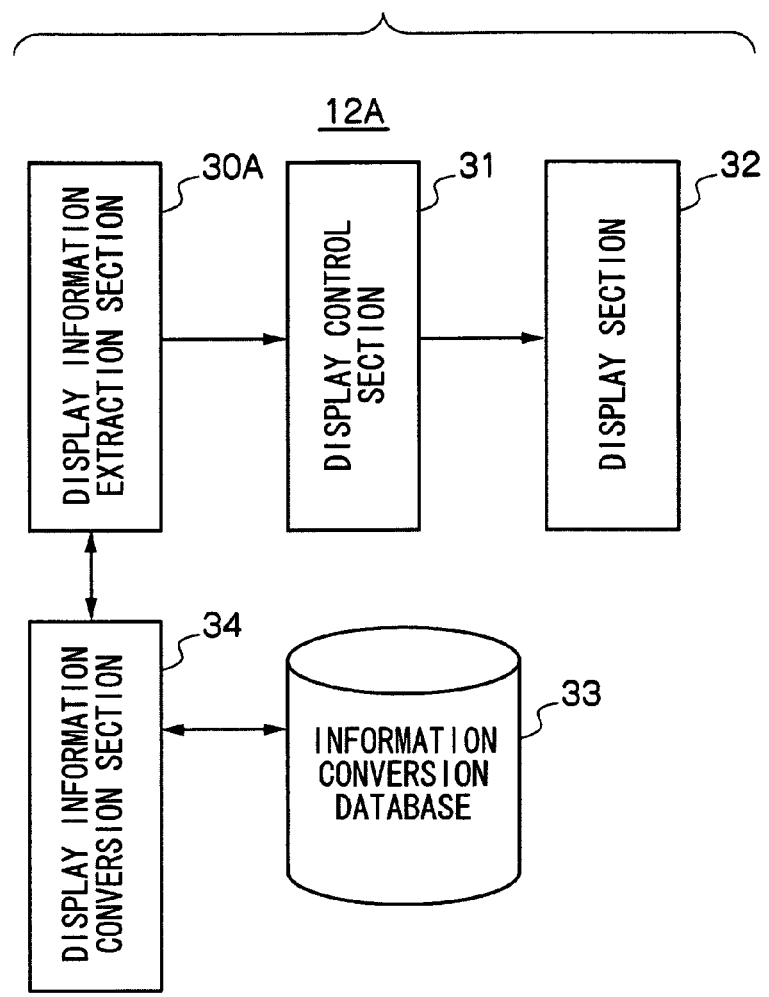
FIG. 6 is a block diagram showing the internal configuration of an addressee terminal with respect to functions associated with addressee notification according to a second exemplary embodiment.

FIG. 6 is a block diagram showing the internal configuration of an addressee terminal according to the second embodiment with respect to functions associated with addressee notification, in which corresponding portions that are the same as in FIG. 4 according to the first embodiment are provided with the same reference numerals.

In FIG. 6, addressee terminal 12A of the second embodiment has information conversion database 33 and display information conversion section 34 in addition to display information extraction section 30A, display control section 31 and display section 32.

In information conversion database 33, One-Number FMC service numbers (i.e., 060 numbers) are associated with the name, nickname or other identification information of the subscriber associated with each number.

Display information extraction section 30A of the second embodiment provides the addressee information (060 number) extracted from an incoming call connection request from application server 14 to display information conversion section 34 rather than to display control section 31.

Display information conversion section 34 accesses information conversion database 33 using the provided 060 number as a key. When the 060 number is not registered in information conversion database 33, display information conversion section 34 sends a response to this effect back to display information extraction section 30A, and when the 060 number is registered in information conversion database 33, display information conversion section 34 sends the subscriber identification information linked with the 060 number back to display information extraction section 30A. The transmission destination from display information conversion section 34 may be display control section 31 instead of display information extraction section 30A.

When a response is received to the effect that the number is not registered, display information extraction section 30A transmits the 060 number to display control section 31, and when a response is received containing subscriber identification information, display information extraction section 30A transmits the subscriber identification information to display control section 31 instead of the 060 number. At this time, calling source information is also transmitted as appropriate.

Similarly to the first embodiment, display control section 31 effects display of the addressee information (and the calling source information) at display section 32.

The same effects can be achieved by the second embodiment as by the first embodiment. According to the second embodiment, since application server 14 is configured to handle only the 060 number as the addressee information, the processing load can be alleviated as compared with the first embodiment. Further, in the addressee terminal, existing telephone directories (databases) can be used as databases for addressee information conversion. The addressee can be determined more reliably and promptly by display of a name or nickname than by display of a number.

(C) Alternative Embodiments

While a variety of alternative embodiments have been mentioned in the explanations of the respective embodiments above, further examples of alternative embodiments include the following.

In the respective embodiments above, addressee information is displayed at whichever of the addressee terminals is designated as the transfer location; however, it is possible to limit the addressee terminals at which addressee information is displayed. For example, addressee information may be displayed only at a fixed terminal. Further, for example, addressee information may be displayed only when there two or more addressee terminals registered as alternative call transfer destinations. Alternatively, for example, a subscriber may decide whether or not to have addressee information displayed. For example, the subscriber may enter into a contract whereby addressee information is displayed when the subscriber is the intended addressee, or it may be made possible to switch between a display mode and a non-display mode via PB (Push Button), DTMF (Dual-Tone Multi-Frequency) or the like.

In the respective embodiments above, the present invention is applied to a One-Number FMC service system; however, the present invention is not limited to application to an FMC service system. For example, the present invention may also be applied to a system in which the alternative transfer destination terminals are all restricted to fixed terminals.

In the respective embodiments above, the addressee terminal outputs the addressee information by display; however, other output methods may be applied. For example, voice synthesis may be applied.

As explained above, according to the present invention, the calling source can notify the intended addressee information to the addressee terminal.

What is claimed is:

1. An addressee information notification system, comprising:

an application server that based on one of a plurality of distinct service numbers each corresponding to one of a plurality of addressees but not associated with a physical terminal, that is requested by an incoming call connection request, selects one transfer destination number from a plurality of alternative transfer destination numbers associated with a plurality of transfer destination terminals, wherein the selected transfer destination number is associated with two or more of the plurality of addressees, and transfers the call connection request to the selected transfer destination number, the application server comprising an addressee information attachment section that attaches addressee information comprising said one service number or identification information associated with said one service number to the call connection request to be transferred to the selected transfer destination number wherein if the call connection request to the selected transfer destination number is an INVITE request message, the addressee information attachment section attaches the addressee information as an optional parameter value of the SIP message header of the INVITE request message; and a plurality of terminals, each of which is configured as an alternative transfer destination, at least one of the plurality of terminals having an addressee information output section that, when a call connection request is provided to the at least one of the plurality of terminals from the application server, outputs addressee information attached to the call connection request before the at least one of the plurality of terminals is taken off-hook, wherein, from among two or more addressees associated with the at least one of the plurality of terminals, the addressee information of the addressee corresponding to said one service number requested by the incoming call connection request is outputted.

2. The addressee information notification system according to claim 1, wherein the application server comprises a subscriber database storing items of subscriber identification information, a fixed-mobile convergence (FMC) service number, one or more transfer destination numbers associated with the alternative transfer destination terminals, and a transfer destination flag indicating which of the transfer destination numbers is currently designated as an active transfer destination terminal, and the application server selects the transfer destination terminal by searching the subscriber database with the service number as an FMC service number, and retrieving the active transfer destination terminal corresponding to the addressee number.

3. The addressee information notification system according to claim 1, wherein the application server is adapted to receive a plurality of incoming call connection requests from a plurality of subscribers respectively associated with one or more fixed-mobile convergence (FMC) service numbers as service numbers, and is adapted to enable the plurality of subscribers to share a same transfer destination terminal as one of the alternative transfer destination terminals associated with their FMC service numbers.

4. The addressee information notification system according to claim 1, wherein the selected transfer destination terminal is selected according to a selection of a subscriber corresponding to the service number.

5. The addressee information notification system according to claim 1, wherein the selected transfer destination terminal is selected according to presence information indicating presence or absence of a subscriber corresponding to the service number.

6. An application server that, based on one of a plurality of distinct service numbers each corresponding to one of a plurality of addressees but not associated with a physical terminal, that is requested by an incoming call connection request, selects one transfer destination number from a plurality of alternative transfer destination numbers associated with a plurality of transfer destination terminals, wherein selected transfer destination number is associated with two or more of the plurality of addressees, and transfers the call connection request to the selected transfer destination number, the application server comprising:

an addressee information attachment section that attaches addressee information comprising said one service number or identification information associated with said one service number to the call connection request to be transferred to the selected transfer destination number, wherein, from among two or more addressees associated with the selected transfer destination number, the addressee information of the addressee corresponding to said one service number requested by the incoming call connection request is attached wherein if the call connection request to the selected transfer destination number is an INVITE request message, the addressee information attachment section attaches the addressee information as an optional parameter value of the SIP message header of the INVITE request message.

7. A communication terminal associated with one of alternative transfer destination numbers in an addressee information notification system in which an application server, based on one of a plurality of distinct service numbers each corresponding to one of a plurality of addressees but not associated with a physical terminal, that is requested by an incoming call connection request, selects one transfer destination number from a plurality of alternative transfer destination numbers, wherein the selected transfer destination number is associated with two or more of the plurality of addressees, and transfers the call connection request to the selected transfer destination number, the call connection request having addressee information comprising said one service number or identification information associated with said one service number attached thereto wherein if the call connection request to the selected transfer destination number is an INVITE request message, the addressee information is attached as an optional parameter value of the SIP message header of the INVITE request message, the communication terminal comprising:

an addressee information output section that, when a call connection request is provided from the application server, outputs addressee information attached to the call connection request before the communication terminal is taken off-hook, wherein, from among two or more addressees associated with the terminal, the addressee information of the addressee corresponding to said one service number requested by the incoming call connection request is outputted.

8. The communication terminal according to claim 7, wherein the addressee information output section extracts calling source number information from the call connection request provided from the application server and outputs the addressee information and the calling source number information.

9. The communication terminal according to claim 7, wherein the addressee information output section comprises an information conversion section that converts the addressee information extracted from the call connection request provided from the application server into an alternative representation of the addressee information.

10. An addressee information notification method, comprising:

making a call connection request to an application server;
selecting, based on one of a plurality of distinct service numbers each corresponding to one of a plurality of addressees but not associated with a physical terminal, that is requested by the call connection request, one transfer destination number from a plurality of alternative transfer destination numbers associated with a plurality of transfer destination terminals, wherein the selected transfer destination number is associated with two or more of the plurality of addressees;
attaching addressee information comprising said one service number or identification information associated with said one service number to the call connection request wherein if the call connection request to the selected transfer destination number is an INVITE request message, the addressee information is attached as an optional parameter value of the SIP message header of the INVITE request message;

transferring the call connection request to the selected transfer destination number;

receiving the call connection request at the selected transfer destination number; and outputting the addressee information attached to the call connection request at the selected transfer destination-number before a terminal associated with the selected transfer destination number is taken off-hook, wherein, from among two or more addressees associated with the selected transfer destination-number, the addressee information of the addressee corresponding to said one service number requested by the call connection request is outputted.

11. The addressee information notification method according to claim 10, wherein the outputting comprises extracting calling source number information from the received call connection request and outputting the addressee information and the calling source number information.

12. The addressee information notification method according to claim 10, wherein the outputting comprises converting the addressee information extracted from the received call connection request into an alternative representation of the addressee information.

\* \* \* \* \*